May 16, 1950   J. H. McLEOD, JR   2,507,606
AUTOMATIC CONTROLLER OF FLUID-PRESSURE TYPE
Filed May 14, 1947   3 Sheets-Sheet 3
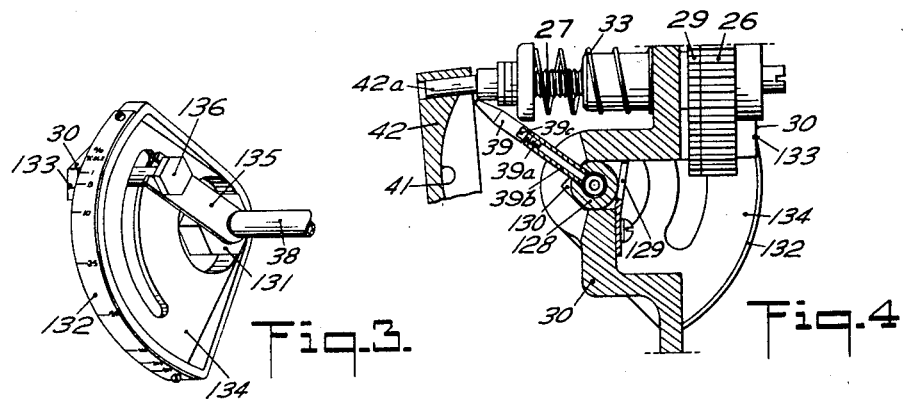
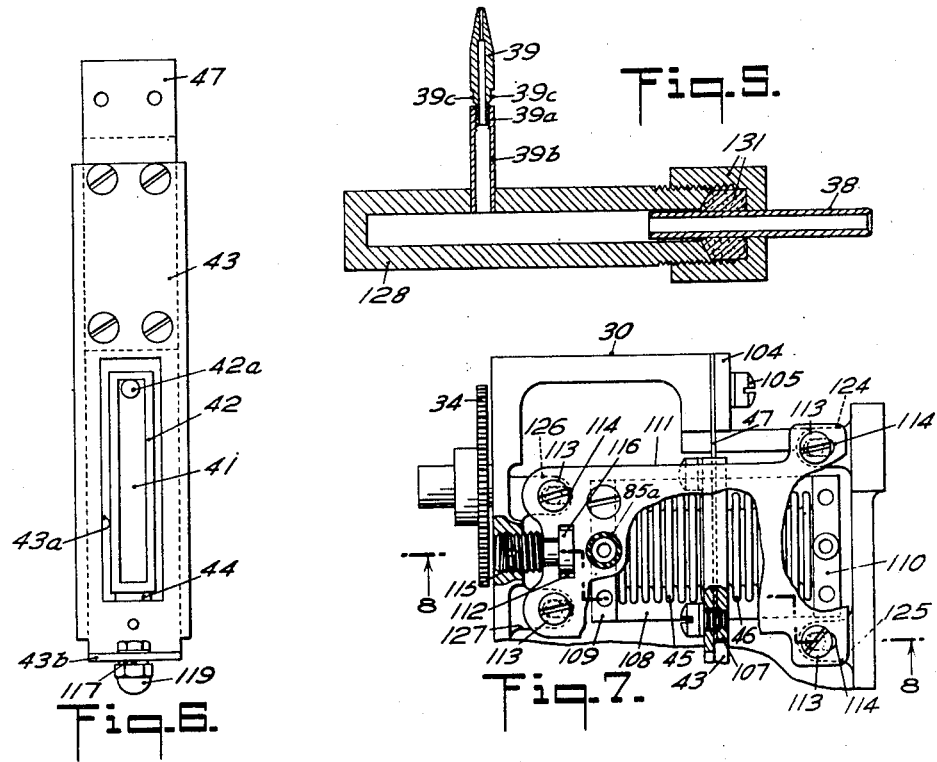
INVENTOR
JOHN H. McLEOD, JR.
BY
Woodcock and Phelan
ATTORNEYS Patented May 16, 1950

2,507,606

UNITED STATES PATENT OFFICE 2,507,606

AUTOMATIC CONTROLLER OF FLUID-PRESSURE TYPE

John H. McLeod, Jr., Philadelphia, Pa., assignor to Leeds and Northrup Company, Philadelphia, Pa., a corporation of Pennsylvania Application May 14, 1947, Serial No. 747,925

14 Claims. (Cl. 137—139)

This invention relates to pneumatic controllers of the type useful for the control of a magnitude of a controlled or measured variable, quantity or condition, such as temperature, pH values, rate of flow or other physical, chemical or electrical condition, and has for an object the provision of a pneumatic controller of compact and reliable design and in which there have been provided a number of novel features.

Pneumatic controllers of the type disclosed in Stein et al. Patent No. 2,285,540 have been in use for a number of years and they have proven to be reliable and desirable for many control applications. Nevertheless, such systems leave something to be desired in economy of operation, particularly as regards the amount of air utilized in a given period of time, and in the flexibility of control to take care of widely varying conditions of operation.

In carrying out the invention in one form thereof, there is provided a pilot unit, which itself can fulfill all of the requirements of the desired controller, and there is further provided a pneumatic relay or booster which operates under the control of the pilot unit and which includes automatically operable valves which decrease to a minimum the use of compressed air in the operation of the controller. Provisions may also be made for the transfer from automatic control to manual control in such a way that the transfer from manual to automatic operation is produced with little or no disturbance of the processes under control, a result heretofore desired but not attained.

The pilot unit itself includes a number of desirable features. First, there is provided a pivotally mounted nozzle adjustable with reference to a curved surface of a baffle rotatable about spaced axes. By predetermining the position of the nozzle along the curved surface of the baffle and with reference to the axes thereof, any desired ratio of primary control action to feed-back action may be selected. One end of the baffle member is hinged to a bellows-operated lever while the other end of the baffle member is pivotally adjusted by a member in response to variation in the magnitude of the measured variable. Adjustment of a cooperating control member serves to preselect the desired control point; that is, the magnitude of the condition or measured variable which is to be maintained by the system as a whole.

For further objects and advantages of the invention and for a detailed description of further novel features, reference is to be had to the following description taken in conjunction with the accompanying drawings, in which:

Fig. 1 diagrammatically illustrates a system for one form of apparatus embodying the invention;

Fig. 3 illustrates in perspective certain parts shown in exploded view in Fig. 2;

Figure 2:
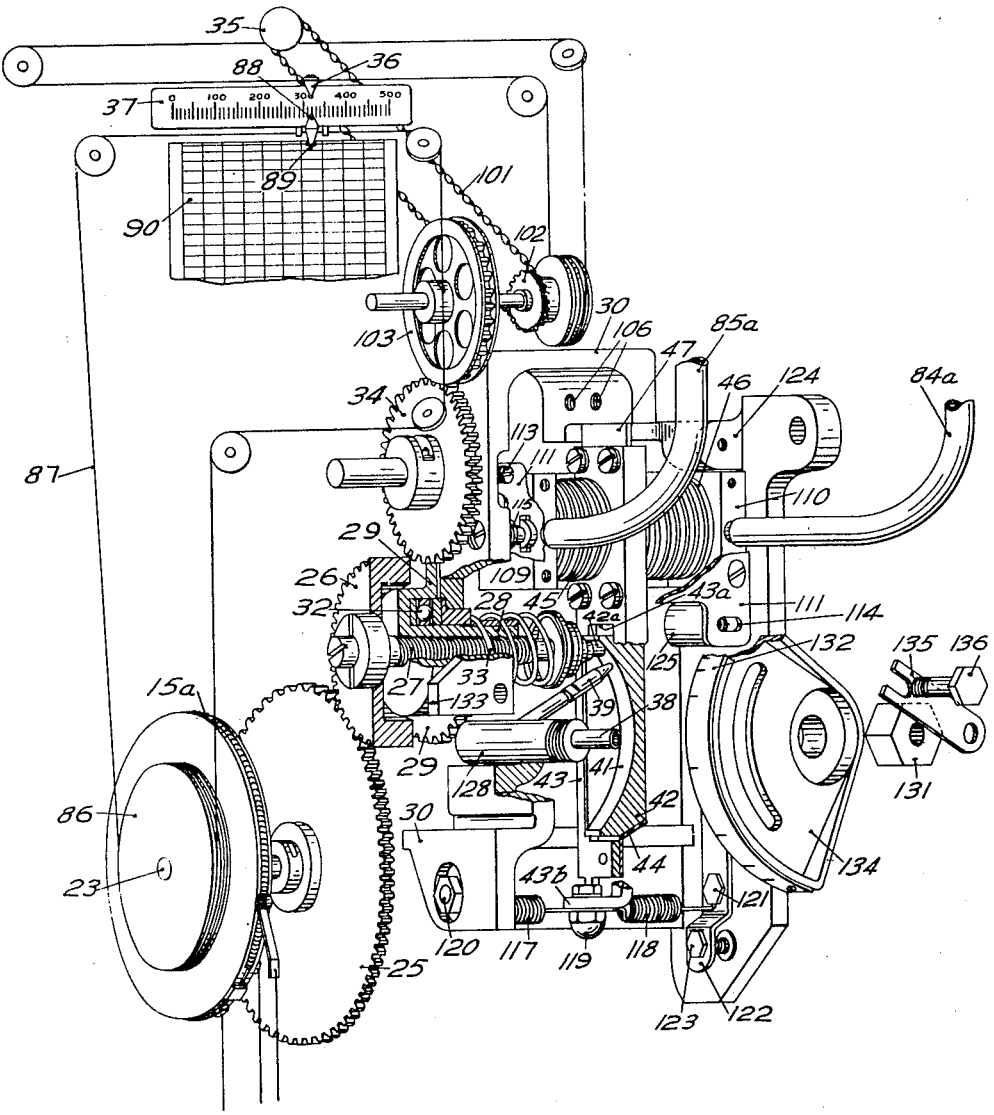
Fig. 2 illustrates, partly in exploded perspective with certain parts cut away and in part diagrammatically, a preferred embodiment of the invention.

Fig. 4 is a view, partly in section, of the nozzle assembly shown in exploded perspective in Fig. 2 with baffle 42 held by screw 27 in a position widely spaced from the nozzle 39 and farther than occurs in usual operation;

Fig. 5 is a sectional view of the nozzle assembly including the packing gland;

Fig. 6 is a view of the bellows-operated arm of the device of Fig. 2, including the hinged baffle;

Fig. 7 is a side view with parts cut away of the bellows-mounting means for the device of Fig. 2; and Fig. 8 is a sectional view taken on the line 8—8 of Fig. 7.

Referring to the drawings, the invention in one form has been illustrated as applied to the control of the temperature of a furnace 10, though the system may, of course, be utilized to control any measured variable such as the magnitude of any other quantities or conditions. As shown, the measured variable, the temperature of the furnace 10, is varied by changing the position of a control valve 11 connected in the fuel supply line 12. The valve 11 may be opened to any desired extent by means of a diaphragm 13 and opposing spring, or other suitable pneumatic operating mechanism. The temperature of the furnace is measured by means of a measuring circuit, including a thermocouple 14 suitably positioned in the furnace and electrically connected to a potentiometer 15 and to a galvanometer coil 16. While the temperature of the furnace may be measured by other apparatus, the system illustrated, which symbolically indicates the measuring instrument or mechanical relay 18 operable under the control of the galvanometer 16, is of the type disclosed in Squibb Patent No. 1,935,732. For a detailed description of the operation of such a mechanical relay 18, reference may be had to said Squibb patent. Briefly, deflection of the galvanometer coil 16 in one direction or the other positions the pointer 17 between a pair of feeler members 19, 19. By suitable cam mechanism the feeler members are released for operation by a spring 20 to position a clutch member 21 with reference to a disc 22. After deflection of the clutch member 21 it is moved into engagement with the disc 22. Thereafter, restoring cams return the clutch member 21 to the position illustrated and, at the same time, rotate the disc 22 and the shaft, diagrammatically indicated by the broken lines 23 and 24.

The slidewire of potentiometer 15 is adjusted in a direction to rebalance the measuring circuit and concurrently a gear 25 in mesh with a gear 26 rotates a screw 27 in one direction or the other, depending upon whether the temperature in the furnace 10 has risen above or fallen below its previous level. The screw 27 is carried by the internally threaded hub 28 of a gear 29, the hub extending through a frame 30 of the pilot device 31. To the end of the screw 27 is secured one element of a thrust bearing 32, the other element of which has bearing against it one end of a spring 33. Th opposite end of the spring bears against the frame 30 and thus axially maintains the gear 29 against the frame 30 and eliminates axial backlash between the screw 27 and the threaded hub 28, and between the gear 29 and the frame 30. The gear 29 meshes with a gear 34 which may be manually rotated by a knob 35 in selection of a desired control point, as determined from the position of a pointer 36 with reference to a suitably calibrated scale 37.

Air is delivered by way of the pipe 38 to the nozzle 39 of the pilot device 31, which nozzle is adjustable about a pivotal axis 40 with reference to the curved surface 41 of a baffle 42. The baffle 42 has one end thereof supported on or by the rounded end of the screw 27 while the opposite end thereof is connected to one end of a lever 43 by means of a leaf spring hinge 44. Thus either end of the baffle may be rotated about an axis adjacent the other end thereof. Near the opposite end of the lever 43 and bearing against it from opposite sides thereof, are bellows 45 and 46. The said opposite end of the lever 43 is connected by a leaf spring 47 to a rotatable member 48 mounted in V-notch 48a of the frame 30 by a clamping plate 49.

The air flowing to the pipe 38 may come from any suitable source of compressed air as from a supply pipe 50 by way of a filter 51, a valve 52, a passageway 53, and a restriction 54 which may be located within a bellows 55. The bellows 55 forms a part of the pneumatic relay or booster 56, which also includes bellows 57 and 58. All three bellows are mounted between a stationary base 59 and a movable plate 60, pivotally supported from the base member 59, as by a flexible hinge or leaf spring 61. Bellows 57 and 58, of substantially the same effective area, are mounted on opposite sides of the flexible hinge 61, bellows 57 being at a greater distance from said hinge than bellows 58. Bellows 58, connected to bellows 57, is provided in order to decrease the effective moment of bellows 57 so that a desired ratio of pressure changes in bellows 55 to those in bellows 57 can be obtained with the use of bellows and lever arms of practical magnitude. A tension spring 62, adjustable by means of the nut 63, biases one end of the movable plate 60 towards the base 59 and against the nozzle pressure developed in bellows 55. Extending through the bellows 57 is a valve actuator 64. As shown, the lower valve 65 and the upper valve 66 are both closed. When the movable plate 60 is rotated in a counter-clockwise direction, as by an increase in pressure in bellows 55, it opens the valve 66. When the plate 60 moves in a clockwise direction, as by a decrease in pressure in bellows 55, the valve seat is moved to open the valve 65 and to connect the bellows 57 to atmosphere.

Because the moment arm of the bellows 58 about hinge 61 is somewhat less than the moment arm of bellows 57, equal pressures on both bellows will result in a moment in clockwise direction on the arm of plate 60. Acting against the resultant moment developed by bellows 57 and 58 is a moment developed by the bellows 55 which, it will be observed, has a much greater arm than those of bellows 57 or 58.

In one embodiment of the invention a one-pound change of pressure in the bellows 55 acquired a ten-pound change in the common pressure in bellows 57 and 58 to balance it. Thus, the ratio of change in pressure due to the different moments was of the order of ten to one. This ratio is independent of the tension on the adjustable spring 62 which is utilized to preselect the magnitude of the output pressure on the diaphragm 13 for a particular setting of baffle 42 relative to nozzle 39.

Figure 1:
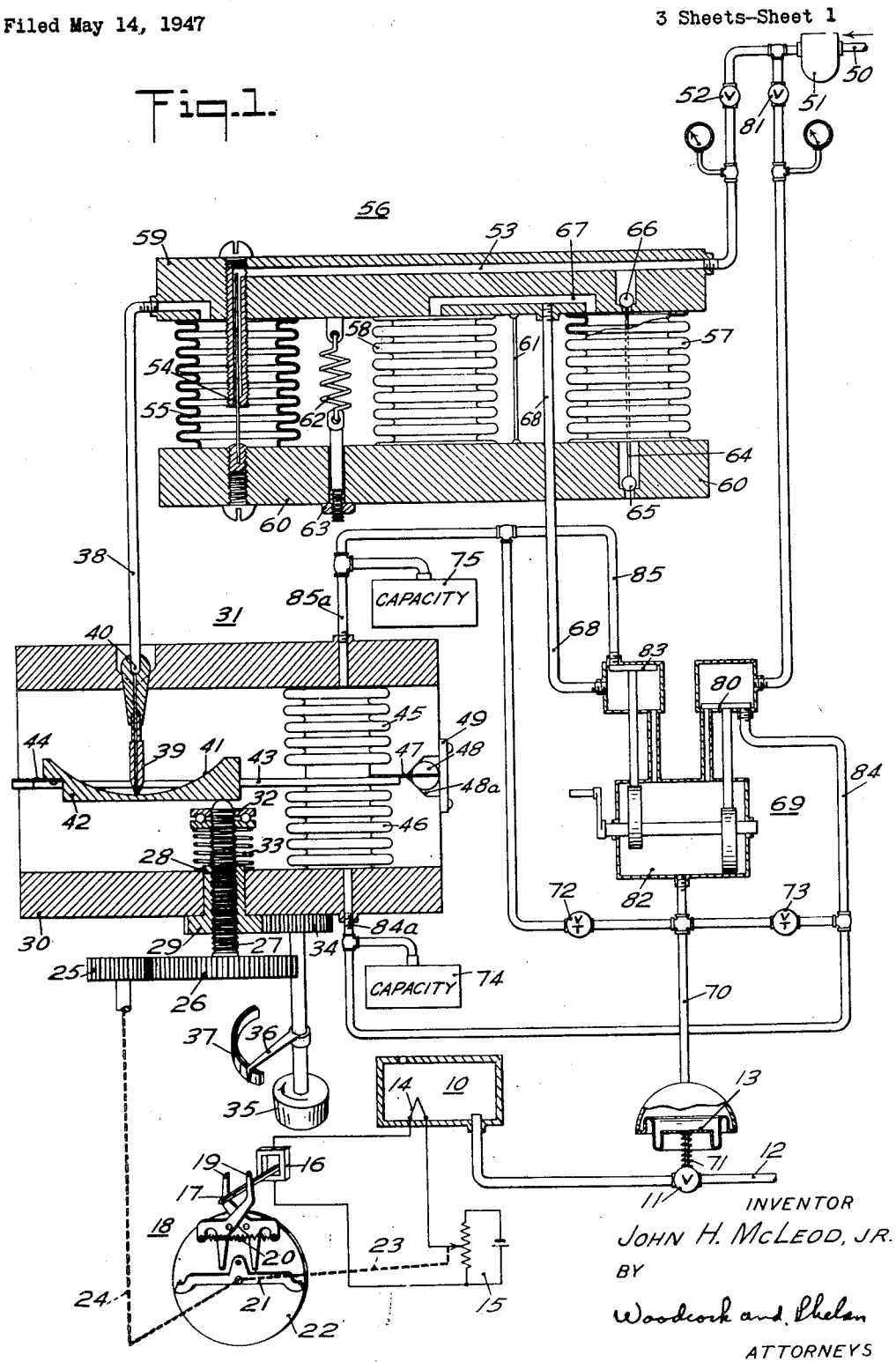

All of the parts of the system of Fig. 1 have been illustrated in positions for automatic control and with the measured variable at the selected control point. If the temperature of the furnace 10 should increase, the mechanical relay 18 will rotate the screw 27 to move it axially downward, as viewed in Fig. 1, thus permitting the baffle 42 to move away from the end of the nozzle 39, the spring hinge 44 normally biasing the opposite end of the baffle 42 against the rounded end of screw 27. Thus, the baffle 42 rotates about its left-hand axis by an amount determined by the movement of screw 27. The increased spacing between the end of the nozzle 39 and the baffle 42, by reducing the restrictive effect of baffle surface 41 on nozzle 39, reduces the pressure in the bellows 55 since air is then lost at a greater rate than it can be supplied through restriction 54. The reduction in pressure in the bellows 55 permits spring 62 to rotate the movable plate 60 in a clockwise direction about the flexible hinge 61 to open valve 65 to atmosphere. Leakage of air from the bellows 57 lowers the pressure therein and results in a counter-clockwise movement of the movable plate 60 to reclose valve 65 and to reestablish a balance at a new value of air pressure within bellows 57. The interior of the bellows 57 is connected to one side of the diaphragm 13 of valve 11 by way of a passage 67, a pipe 68, a transfer valve 69 and a pipe 70. Accordingly, the reduction in pressure in the bellows 57 is accompanied by a corresponding reduction in pressure on the upper side of diaphragm 13 whereupon the spring 71 operates the valve 11 in a direction to reduce the flow of fuel to the furnace 10.

In the system as thus far described, an exceedingly small movement of the screw 27 will produce movement of the valve 11 from one extreme position to the other extreme position. In one embodiment of the invention, a change in the position or setting of the screw 27 of one-tenth of one percent of the full-range movement of the screw was sufficient to produce movement of the valve 11 between fully opened and fully closed positions. In other words, the proportional band was very narrow and resulted in on-and-off operation of the valve 11. Nevertheless the steep gradient or wide change in pressure for a small movement of the screw 27 is an indication of the inherently high sensitivity of the system and this inherent sensitivity is retained in the system with the additional features hereinafter described. In so far as theory is concerned, the pilot unit 31 could be used without the booster. However, to give fast and positive operation with a minimum consumption of air, the booster unit 56 is preferably included in all systems embodying the invention.

Further in accordance with the invention, the proportional band may be widened and made adjustable throughout a very substantial range. For example, in terms of the indicator scale, a change in the measured variable of one-tenth of a full-scale change thereof may effect an adjustment of the valve 11 by one-tenth of its full range of movement between its "on" and "off" positions. Alternatively, the same one-tenth change in the measured variable can be utilized to produce from zero change in the valve setting to as much as full-range movement of the valve.

To simplify the description of how the foregoing is accomplished, it will be assumed that the output pressure, that in pipe 70, will be that of the pipe 38 and the following description will disregard restriction 72 or will assume that throttle valve restriction to be fully open. With such direct assumed connection between pipes 38 and 70, any change in the output pressure applied to diaphragm 13 will, through the action of the bellows 45, cause the baffle-support lever 43 to move the left-hand end of the baffle 42, to which it is fastened by a flexible hinge 44, in a direction opposite to that in which the right-hand end of baffle 42 was originally moved by the screw 27. Thus, for the rise in temperature, previously assumed, the screw 27 moved downwardly. The resultant decrease in the output pressure acting through bellows 45 then raises the left-hand end of baffle 42. By reason of this opposite adjustment of the baffle 42, a negative feed-back action is introduced, the magnitude of which is a function of the nozzle-baffle characteristics, of the spring constant of the baffle-support mechanism (that is, of the bellows and flexible hinges and other springs attached thereto) and of the position of the nozzle 39 along the curved surface 41 of the baffle 42 with respect to the pivotal axes of baffle 42.

Since the baffle 42 is pivotally mounted so that its opposite ends are respectively movable in response to change in the adjustment of screw 27 and in the position of lever 43, an adjustment of the nozzle 39 along the baffle serves to adjust the amount of negative feed-back and, therefore, changes the width of the proportional band. In other words, any decrease in output pressure due to a rising temperature through said feed-back action immediately results in movement of the baffle 42 in the same direction as would be produced by a falling temperature with corresponding rise in output pressure.

The nozzle 39 may be moved to and beyond the pivotal supports of the baffle 42. Since the width of the proportional band is affected by, or depends upon, the magnitude of the negative feed-back action, the width of the band will increase as the nozzle 39 approaches the pivotal axes determined by the flexible hinge 44. In other words, with the nozzle 39 adjacent the left-hand pivoted end of baffle 42, as viewed in Fig. 1, small movements of the lever 43 result in negative feed-back of much greater magnitude than with the nozzle 39 nearer the screw 27.

It may here be observed that with the parts in the positions shown, the nozzle 39 may be rotated to any desired position along the curved surface 41 extending between the pivoted points of the baffle 42, without changing the spacing between the end of nozzle 39 and the surface 41 for the reason that the curved surface 41 is at all points equidistant from the pivotal axis 40 of nozzle 39. Thus, the pressure in the pipe 38 will be the same regardless of the position of the nozzle 39 along the surface 41. However, a change in the angular position of the nozzle 39, with respect to the baffle 42, serves to adjust the ratio of negative feed-back action to primary control action from zero to extremely high values. The feed-back action may also be changed from negative to positive.

With an instrument including only the features thus far described, particularly with the addition only of the bellows 45, there would be present only proportional-position action; that is, action where there is continuous linear relation between the value of the controlled variable and the position of the final control element, the valve 11.

It will be remembered that without the bellows 45 the system would function like an "on-and-off" control. The proportional band would be so narrow as to provide that kind of operation. In such a system, because of the on-and-off action, the measured variable would violently oscillate about the control point, specifically the selected temperature to be maintained. The provision of the bellows 45 eliminates the oscillation of the measured variable but produces in the system a substantial offset or drooping characteristic. Because of the bellows 45, any change in the setting of the valve 11 requires that the thermocouple be maintained at a temperature higher or lower than that selected for the control point. Thus, if the temperature rises because of a decreased demand, as we have already assumed, the valve 11 can be maintained in a more nearly closed position to reduce the fuel to the furnace 10 only by maintaining the temperature of the thermocouple 14 at a somewhat higher value than that selected for the control point. Such an offset is required to produce the control action and is known as "droop." While the system including the bellows 45 provides a smoothly continuous change in the position of the valve 11, with changes in the controlled variable, the aforesaid droop is in most cases highly undesirable.

By providing the bellows 46 subjected to the same pressure as the bellows 45 but through a restriction, such as a throttle valve 73, there is eliminated the associated droop or offset, yet the system retains its inherent sensitivity as well as the other advantages incident to the use of the bellows 45. More particularly, with the aforesaid assumed rise in temperature of the thermocouple 14 and with the corresponding adjustments of the baffle 42 and the contraction of the bellows 45, a pressure differential appears across the restriction 73 because the pressure in pipe 70 and on diaphragm 13 has been reduced. Temporarily the pressure in the bellows 46 will be higher than in the bellows 45. However, flow of air through the restriction 73 occurs over a time interval, the length thereof depending primarily upon the setting of the throttle valve or restriction 73, and until the pressure in bellows 46 is equal to that in the bellows 45. When the pressures in the two bellows are equal, the lever 43 will be substantially in its original position; that is, the position shown in Fig. 1, and yet there will have been established a new pressure on the valve 11 to hold it in a new position which will maintain the measured variable or temperature of the thermocouple 14 at its preselected value. During the time interval in which the pressure in the bellows 46 approaches equality with that in bellows 45, the system operates with the proportional-position action described above but at the expiration of that time interval the offset or droop will have been substantially eliminated. The new operation introduced by the addition of the bellows 46 has been defined by workers in the art as reset action and, as already explained, it can be adjusted by changing the setting of the throttle valve 73.

Though the system thus far described is suitable for many applications, an additional control effect is provided which has been found highly desirable in some control applications. This is accomplished by including in the line to the bellows 45 a restriction, shown as throttle valve 72. After a change in pressure caused by primary control action, the restriction 72 has the effect of delaying negative feed-back pressure by an interval proportional to the pressure drop created across said restriction and thus the pressure on diaphragm 13 of valve 11 is incrementally varied in accordance with that pressure drop. As the pressure in bellows 45 approaches that on diaphragm 13, due to fluid flow through restriction 72, the negative feed-back action becomes fully effective and the "rate action," later so identified, disappears. In other words, the effect of restriction 72 is transitory and self-extinguishing. However, if a constant rate of change of primary control action is established and maintained, the pressure drop across restriction 72 will assume a constant value having a continuously linear relation to said rate of change and an increment equal to this pressure drop will be added to or subtracted from the pressure on diaphragm 13 and a corresponding increment of displacement will be added to or subtracted from the position of valve 11. The effect described will be recognized by those skilled in the art as "rate action." It should be understood that though restriction 72 is adjustable, it must always be so adjusted that the pressure changes in bellows 45 occur at a faster rate than those in bellows 46, or instability will result from the positive feed-back effect of bellows 46 which would then be greater than the stabilizing negative feed-back effect of bellows 45.

In order that reasonable time intervals may be provided, without undesirably small valve-openings, for operation in a direction tending to equalize the pressures between bellows 45 and 46 and with reference to the pressure applied to the valve 11, capacity tanks 74 and 75 may be provided. They need not be very large in order satisfactorily to increase the volume of the system and ordinarily will be somewhat larger than the volume of the respective bellows 45 and 46.

While the foregoing description has been largely in terms of the assumed rise in temperature, it will of course be understood that a decrease in the temperature of thermocouple 14 will cause the various components to function to readjust the valve 11 in the direction to increase the fuel supply to the furnace 10 to maintain the temperature at the control point.

If a new selected temperature is desired in the furnace 10, it is only necessary to rotate the knob 35 which, through the gear 34, turns the gear 29 and its threaded hub 28 to move the screw 27 in one direction or the other. For example, if the control point, or the temperature to be controlled is to be lower, the knob 35 will be rotated in a clockwise direction as indicated by the arrow on knob 35. The gear 34 will rotate the gear 29 and the threaded hub 28 in a direction to move screw 27 axially downward, thereby to rotate the baffle 42 in a clockwise direction about the axis provided by the hinge 44. Conversely, to increase the temperature or to elevate the control point the knob 35 is rotated in a direction opposite to the direction of the arrow shown thereon.

In the limit, if the nozzle 39 be rotated in a clockwise direction to such setting that the end thereof is located effectively at the left-hand pivotal axis of the baffle 42, no change in position of the screw 27 or in the position of the baffle 42 about that axis will be effective to change the pressure in the system, particularly that on diaphragm 13. However, in that assumed limit, the slightest change in position of the baffle 42 about the axis determined by the rounded end of the screw 27 will produce a tremendous change in the pressure on valve 11. Thus, in the assumed limit, the feed-back section with the nozzle 39 at the axis formed by the hinge 44 would be exceedingly great while the primary control action produced by the change in position of the screw 27 will be zero. Of course, this is a theoretical limit as there would be no control action. The device would not ordinarily be adjusted with nozzle 39 at the aforesaid limit. On the other hand, with the nozzle 39 moved in a counter-clockwise direction until it is effectively at the right-hand axis of rotation of the baffle 42, movement of the lever 43 with resultant rotation of baffle 42 will not change the pressure on the valve 11, but any change in position of the screw 27 will produce a relatively great change in the pressure on the valve 11. In this case, the negative feed-back action will be zero but the primary control action will be a maximum. Thus, it will be seen that with the nozzle 39 in intermediate positions the ratio of the negative feed-back action to the primary control action may be varied in the limits from zero to infinity as the nozzle is positioned to utilize any complementary desired fractions of feed-back and primary control actions between zero and unity.

To illustrate a further capability of the system, if the nozzle 39 be adjusted in a counter-clockwise direction beyond the right-hand axis, ordinarily beyond a line extending from the axis 40 to the rounded end of screw 27, then the feed-back action resulting from movement of the lever 43 by bellows 45 is effective in a positive direction; that is, to adjust the baffle 42 in the same direction as produced by rotation of the screw 27. By this means the offset characteristics inherent in the nozzle-baffle relationship can be entirely cancelled, permitting an overall theoretical adjustment of the proportional band from zero under these conditions to infinity under the conditions previously cited where the nozzle is effectively over the left-hand point of rotation of the baffle 42.

The pneumatic relay or booster 56, as has already been explained, is utilized not only to minimize air consumption but also to act as a pneumatic amplifier to produce in the output bellows 57 amplified pressure changes proportional to those in nozzle pipe 38. With the parts in the positions illustrated in Fig. 1, the only flow of air is by way of the restriction 54 to the nozzle 39, which is of a relatively low order, for example, one-third of a cubic foot per minute. The consumption of air with this system is of such a low order that it becomes feasible continuously to operate the controller in emergencies from a limited source of supply such as a cylinder of compressed air or gas.

Since the restriction 54 is interposed between the source of supply 50 and the nozzle pipe 38, the pressure in the bellows 57 may be of a higher order than that in the nozzle pipe 38. However, any change in the pressure in the nozzle pipe 38, by reason of movement of the baffle 42, immediately changes the pressure within the bellows 55 in manner already explained to produce the pivotal movement of the plate 60 which opens or closes the ball valves 65 and 66 to produce a related and greater pressure change in the bellows 57, which is applied by way of the pipe 68, the transfer valve 69 and the valve 70 to the diaphragm 13 of valve 11. Thus, the pressures applied to the bellows 45 and 46 are functions of the pressure on the diaphragm 13 of valve 11 which will be that in the bellows 57 rather than the pressure in the pipe 38 as was earlier assumed in the description of the control action without the booster.

The automatic-manual transfer valve 69 is an optional feature of the system. As shown, it is in the "automatic" position and connects the pilot and booster as above described. When turned from the illustrated automatic position to the manual position it raises valve 80, thereby connecting the manual control regulator 81 to the pipe 70 and diaphragm 13 by way of the operating cam chamber 82 which serves as a manifold. At the same time, it lowers valve 83 to shut off the automatic controller output pressure from chamber 82 and to the diaphragm 13. The valve 80, in manual position, is also effective to open a by-pass 84 around the reset restriction 73. At the same time, the valve 83 opens a by-pass connection 85 around rate restriction 72. The result is that the bellows 45 on manual control is directly connected to the pressure within the bellows 57 while the bellows 46 is directly connected to the pressure on the diaphragm 13. The valve 11, under manual control, is positioned entirely in accordance with the setting of the manual control valve 81 and is not affected by changes in pressure in either the pilot unit 31 or the booster unit 56. Nevertheless, air continues to flow through the nozzle 39 and the screw 27 continues to be adjusted in accordance with changes in magnitude of the temperature within furnace 10. Thus, with the valve 81 manually adjusted to bring the temperature of furnace 10 to the control point, as indicated on scale 37 by pointer 36, a pen 89 or an indicator 88 (as shown in Fig. 2) will be gradually moved by the relay 18 until it coincides with the selected control point. That will then be a proper time for transfer from manual to automatic operation. If the transfer is then effected, the pressure within the bellows 46 will, of course, be equal to that on the diaphragm 13 and the pressure within the bellows 45 will be equal to that in the bellows 57. With the temperature in furnace 10 at the control point, the pressure at diaphragm 13 of valve 11 and within the bellows 57 will be equal. Accordingly, there will be no change in the position of the valve after the transfer has been made from manual to automatic operation and there will not be any change in the temperature of the furnace 10 by reason of the transfer. This is a substantial advantage since the transfer from manual to automatic operation can be effected without in any way changing the conditions of the process under control.

By direct connection of the bellows 45 to the bellows 57, the negative feed-back action is maintained and, therefore, should the transfer be made with the system operating slightly away from the control point, the negative feed-back action is immediately effective and in proper magnitude to bring it back to control with a minimum of change in the magnitude of the condition under control or a minimum disturbance of the process being controlled.

In the foregoing description the operation has been in terms of positive pressures applied to the supply pipes. If desired, negative or subatmospheric pressures may be utilized, the direction of fluid flow being reversed with such operation as against the direction of fluid flow in Fig. 1 by reversed position of the seats of valves 65, 66.

The present commercial form of the invention has been illustrated in Figs. 2–8 and parts thereof having functions corresponding with those in Fig. 1 have been given like reference characters. Where in Fig. 1 there has been diagrammatically illustrated the mechanical relay 18, in Fig. 2 only a shaft 23—24 of the relay has been illustrated. This shaft carries a slidewire resistor 15a which comprises the resistor of the potentiometer 15 of Fig. 1. Also carried on this shaft is a driving pulley 86, by means of which a violin string or cord 87 is driven for movement of an index 88 relative to the scale 37. Associated with the index 88 is a pen or stylus 89 for marking a suitable record on a strip chart 90. Thus, as fully shown and described in the aforesaid Squibb patent, the magnitude of the measured variable is indicated on the scale 37 and recorded on the strip chart 90. The selected control point is indicated by the position of the index 36 on the scale 37. For convenient selection of the control point, the adjusting knob 35 is mounted on the front of the instrument. Through a chain drive 101 and gears 102, 103 and 34, rotation of the gear 29 and of the hub 28 is effected to change the position of the screw 27. In this way the baffle 42 is rotated in a selected direction about an axis determined by the spring hinge 44. The baffle 42 carries a thrust bearing 42a which engages the end of the screw 27.

In this modification of the invention, the lever 43 is of channel construction with a central part cut away to form a rectangular opening 43a, for admission of the nozzle 39 and the end of the screw 27, Fig. 6. The upper end of lever 43 has clamped to it a spring hinge 47 which is also clamped to the frame 30 by means of a clamping member 104, Fig. 7, secured to the frame by means of threaded screws 105 which enter the threaded openings 106, Fig. 2. The bellows 45 and 46 respectively bear on opposite sides of the lever 43. As shown, the open channel section of lever 43 in the region of the bellows includes a member 107 which may also serve to clamp the spring 47 to the lever 43.

The bellows 45 and 46 are carried in a subframe comprising a lower plate 108, Fig. 8, spacing members 109 and 110 which support the respective ends of bellows 45 and 46, and a top plate 111. The plate 111, fastened to the spacer members 109 and 110 as by screws, has one end extending outwardly toward the left-hand end of the frame 30, as viewed in Figs. 7 and 8, with a rectangular opening 112 therein. The upper plate 111 rests upon posts extending from the frame 30 and into which there threadedly extend clamping screws 113. Two of these posts, the posts 124 and 125 appear in Fig. 2 and all posts, including posts 126 and 127, appear in Fig. 7. The screws 113 extend through elongated openings 114 in the plate 111. Consequently, by providing an adjusting screw 115 threaded in the frame 30 the plate 111 may be moved to the right or to the left as viewed in Figs. 7 and 8 by engagement of an enlarged end 116 of the screw 115 with the side of the rectangular opening 112. Accordingly, if the adjusting screw 115 be rotated in one direction the bellows assembly as a whole may be moved to the right with reference to the lever 43. The result of such a movement will be to increase the compression on bellows 46 to shorten it, and to lengthen the bellows 45. Conversely, opposite rotation of the screw 115 will shorten the bellows 45 and will lengthen the bellows 46.

As above stated, the pressures developed in the bellows 45 and 46 are equal when the measured variable is at the control point and the parts are in the positions illustrated in Fig. 1. If there is any difference between the effective areas of the two bellows 45 and 46, equal pressures therein will not produce equal moments on the arm 43 since the bellows with the greater effective area will produce the greater force on the lever 43. While bellows can be made with relatively high uniformity as regards cross-sectional area, some variations nearly always appear therein. In accordance with the invention, it has been discovered that a lengthening or shortening of a bellows will cause it to act in the same way as though the effective area had been decreased or increased. In other words, the force/pressure characteristics of the bellows may be modified within very useful limits. Accordingly, in calibrating the instrument the adjusting screw 115 permits a factory adjustment to take care of small differences of areas as between bellows 45 and 46. After the needed adjustment has been made by rotation of the screw 115, the clamping screws 113 serve tightly to hold the bellows assembly in fixed position.

It may further be observed that if one elastic bellows be lengthened and the other shortened, it is necessary to correct for the change of their inherent spring effects on the lever 43. This may be conveniently done by adjusting means provided at the lower end of lever 43, Fig. 2, which specifically comprises a pair of springs 117 and 118, which may be formed from a single length of wire, the respective springs being located on opposite sides of lever 43 and axially joined together.

The end 43b of lever 43 is clamped to the connecting portion of springs 117 and 118 by means of a nut-and-bolt assembly 119, Fig. 6. The left-hand end of spring 117 is fastened by a bolt and nut 120 to the frame 30 while the opposite end of spring 118 is clamped by a bolt 121 to a flexible arm 122 secured at one end to the frame 30 by any suitable means (not shown). Through its outer free end there extends a screw 123, the latter being threaded into the frame. By rotating the screw 123 the flexible arm 122 may be moved toward or away from springs 117 and 118 to change the tension thereof and to rotate the lever 43 around its pivotal axis as determined by the flexible hinge 47. For major changes in the position of the lever 43 the bolt assembly 119 may be loosened and one end 43b of the lever moved to the right or to the left, as shown in Fig. 2, between the springs 117 and 118.

The nozzle 39 is rotatable about the axis of the air-supply tube 38 which leads to a suitable source of compressed air or gas. As best shown in Fig. 4, the nozzle 39 extends outwardly from a cylinder 128 which is pressed by a leaf spring 129 against the sides of a V-shaped notch 130 formed in the housing 30. This geometric mount provides automatic centering of the cylinder 128 so that the axis of rotation of the nozzle 39 will be fixed and predetermined with respect to the frame 30. The leaf spring 129, held in place by suitable screws, presses against the cylinder 128. There is sufficient friction between the relatively movable parts to maintain the nozzle 39 in any selected angular position. As best shown in Fig. 5, the nozzle 39 may be provided with a threaded end 39a which threadedly engages a tube 39b, suitably secured to the cylinder 128. The threaded connection is of the character which develops high friction so that if a wrench be applied to its flattened sections 39c, the nozzle 39 may be moved either away from, or toward, the cylinder 128 to adjust the radius of arc of the nozzle tip to conform to the radius of curvature of surface 41 of the baffle 42. The cylinder 128 may be provided with a packing gland 131 so that the air-inlet tube 38 may be stationary. Alternatively, tube 38 may be bonded to cylinder 128 and the connection to the air supply may be made as by a flexible hose.

As shown in Fig. 2, the position of the nozzle 39 with respect to the ends of the baffle 42 is indicated by a scale 132 which is rotatable with the cylinder 128 and relative to a stationary index 133, Figs. 3 and 4, forming a part of frame 30. The sector 134 which carries the scale 132 is secured to the cylinder 128 by any suitable means. In order to hold the delivery pipe 38 stationary upon movement of the sector 134, a restraining arm 135 may have one end brazed, Fig. 3, or otherwise secured to the delivery pipe 38 while its opposite slotted end embraces a stud 136 which is threaded into that part of the frame 30 which carries the index 133.

The scale 132 for the nozzle may be calibrated as a proportional-band scale expressed as the ratios of movement of index 88 to the calibrated length of scale 37 required to produce movement of the valve 11 between full-on and full-off. To illustrate, in Fig. 2 the index 88 indicates 320 on the scale 37 which is calibrated from 0 to 500. If a movement of the index 88 from 320 to 370 causes the control to move the valve from its open position to its closed position, the proportional band will be ten per cent. The same action will result from a movement of index 88 from 320 to 270, thus causing the valve to move from full-open to fully closed position. Of course, in the foregoing illustrations it has been assumed that the nozzle 39 occupied a position with respect to the curved surface 41 of baffle 42 to produce the ten per cent proportional band referred to. Thus, the scale 132 may be calibrated as a proportional-band scale and in one modification of the invention this proportional-band scale was calibrated from one per cent to one thousand per cent. In the one per cent position, the nozzle 39 would be adjacent the upper end of the curved surface 41 as viewed in Fig. 2. In the one thousand per cent position, the nozzle 39 would be near the lower end of the curved surface 41 as viewed in Fig. 2. In the one hundred per cent position full-range movement of the valve between open and closed positions would require a full-range movement of the index 88 with respect to the index 36; that is, a movement equal to the movement of index 88 from 0 to 500.

Similarly, movement of the adjusting segment 134 relative to the index 133, Fig. 3, to the five hundred per cent proportional-band position is effective further to widen the band so that even greater changes in the measured variable would be required to produce like changes in position of the valve 11 as compared with narrower proportional bands above referred to. The proportional band may extend from one per cent or less to one thousand per cent or more, the limits referred to above being those selected for a typical embodiment of the invention and are not herein to be taken as limitative of the permissible width of the proportional band.

It may be further noted that with the scale 132 set for a five hundred per cent proportional band, the range of valve movements due to proportional action would be only twenty per cent of the full range of movement from open to closed positions. A pH control is typical of systems where such wide proportional bands are employed.

It has earlier been mentioned that the functions of the screw 27 and of the hub 28 may be interchanged as, for example, where valve 11 of Fig. 1 might be utilized to control the flow of refrigerant in a cooling apparatus. In such case, a rise in temperature would require the opening of the valve 11 rather than movement of it toward the closed position as was the case in the heating system of Fig. 1. This interchange of functions is readily accomplished in the embodiment of Figs. 2-8 by an axial shift of gear 34 from engagement with gear 29 to meshing engagement with gear 26 and by axial shift of the gear 25 from engagement with the gear 26 to meshing engagement with the gear 29. In this connection, it will be observed that the gear 103 is provided with shrouds so that upon axial movement of the gear 34 the gear 103 likewise will be axially moved along its shaft. Of course, in the final selected position of the gears, set screws may be provided for securing the gears to their respective shafts.

It will, of course, be apparent from an inspection of the drawings, Fig. 2, that clockwise rotation of the gear 25 acts directly through gear 26 to rotate the screw 27 in a counter-clockwise direction with consequent axial translation thereof to the left. This translation occurs without disengagement of the gear 26 due to the wide face thereof, provided for that purpose. With the gear 25 in mesh with the gear 29, the same clockwise rotation will rotate the gear 29 in a counter-clockwise direction to rotate the threaded hub 28 in a counter-clockwise direction for axial translation of the screw 27 to the right. In the latter case, the gear 34 which would then be meshing with the gear 26 is effective to select the control point by rotation of the screw 27 upon rotation of the control knob 35.

While preferred embodiments of the invention have been disclosed, it is to be understood that certain features may be used without other features thereof, and that additional modifications may be made within the spirit and scope of the appended claims.

What is claimed is:

1. In a control system including fluid-pressure-operated means for producing a graduated control action affecting the magnitude of a condition, the combination of pressure-controlling means comprising a device having a relatively adjustable nozzle and a baffle for regulating the fluid pressure applied to said pressure-operated means, means mounting said nozzle for pivotal movement about an axis, said baffle having a nozzle-obstructing surface of curvature determined by the length of said nozzle from its axis to the end thereof, a lever pivoted at one end and extending generally parallel to said baffle, means pivotally connecting one end of said baffle to the outer end of said lever, a member for rotating the unpivoted end of said baffle in response to a change in the magnitude of said condition for varying said pressure, negative feed-back means for rotating said lever to move said baffle in a direction to change said pressure in a direction opposite to that produced by said first-mentioned rotation of said baffle, and means for holding said nozzle in a selected angular position for selection of any desired ratio of feed-back action to control action.

2. In a control instrument, the combination of a fluid-conducting nozzle, means mounting said nozzle for pivotal adjustment about an axis, a baffle having a flow-obstructing surface for varying the fluid pressure within said nozzle, said surface having a curvature substantially corresponding with the length of said nozzle from its axis to an end thereof, a lever having bellows on opposite sides thereof for pivotally supporting and moving one end of said baffle about an opposite pivoted end thereof, means operable by a change in the magnitude of a condition for moving said last-named end of said baffle for changing the pressure within said nozzle, and a pair of springs disposed to apply opposing biasing forces to said lever, said mounting means for said nozzle providing for pivotal movement thereof along any portion of said curved surface and beyond and in spaced relation therewith.

3. In a control instrument, the combination of a fluid-conducting nozzle, means mounting said nozzle for pivotal adjustment about an axis, a baffle having a flow-obstructing surface for varying the fluid pressure within said nozzle, said surface having a curvature substantially corresponding with the length of said nozzle from its axis to an end thereof, means including bellows for pivotally supporting and moving one end of said baffle about an opposite pivoted end thereof, a screw member rotatable in response to change in the magnitude of a condition for moving said last-named pivoted end of said baffle, and means for holding said nozzle member in any selected angular position about its pivot with the end thereof disposed in operative flow-restricting relation with respect to said curved surface.

4. The combination set forth in claim 3 in which structure is provided for axially moving said screw member independently of change in the magnitude of said condition for varying the setting of said baffle member with respect to said nozzle.

5. The combination set forth in claim 3 in which said screw member is in threaded engagement with a second member, means for rotating said second member for axial adjustment of said screw member for movement of said baffle toward or away from said nozzle independently of changes in the magnitude of said condition.

6. The combination set forth in claim 5 in which said screw member carries a thrust bearing at one end thereof, a frame, a second member having an enlarged end and a threaded hub portion extending through said frame and in which said screw member is threaded, and a spring between said frame and said thrust bearing eliminating axial backlash therein by holding the parts in predetermined axial position.

7. In a control instrument, the combination of a fluid-conducting nozzle, a flow-obstructing baffle associated with said nozzle, means for adjusting the position of said baffle relative to said nozzle comprising a stationary member, an internally threaded hub extending through said stationary member, a member threadedly extending through said hub and into engagement with said baffle, a thrust bearing and a spring for biasing said threaded member and said hub against said stationary member for elimination of axial backlash, and means for relatively adjusting said hub and said threaded member for positioning said baffle with respect to said nozzle.

8. In a control instrument, the combination of a fluid-conducting nozzle, a baffle having a flow-obstructing surface adjacent the end of said nozzle the spacing therebetween determining the pressure within said nozzle, means responsive to the magnitude of a condition for moving one end of said baffle relative to said nozzle, a pivoted lever, a pair of opposed bellows for moving the opposite end of said baffle to vary its position with respect to said nozzle, a cradle for supporting the respective ends of said bellows remote from said lever, and means for moving said cradle relative to said lever for relative adjustments in the lengths of said bellows, and adjustable spring means associated with said lever and acting upon it in a direction and with a magnitude to compensate for any differing bias applied to said lever by said bellows due solely to changes in length of said bellows for production of a change in the force/pressure characteristics of said bellows.

9. The combination with a control instrument, an adjustable lever, bellows oppositely engaging said lever for moving it to predetermined positions, means varying the force/pressure characteristic of said bellows in the same manner as would a variation in the effective area thereof comprising a cradle supporting the respective ends of said bellows remote from said lever, means for adjusting the relative lengths of said bellows with reference to said lever to increase and decrease relative to said lever the respective lengths of said bellows comprising adjusting and locking means for said cradle, and adjustable spring means acting on said lever and said bellows to compensate for differences in the bias produced by said bellows on said lever due to the differing lengths thereof when like pressures are applied thereto.

10. In a control instrument, the combination of a fluid-conducting nozzle, a baffle having a flow-obstructing surface in cooperative relation with the open end of said nozzle for variation of the pressure within said nozzle, condition-controlling means operable by fluid pressure, means for applying to said condition-controlling means a pressure related to that within said nozzle automatically to vary its position with changes of pressure within said nozzle, a lever for adjusting said baffle relative to said nozzle, opposed bellows acting on said lever, means for applying to said bellows by way of one or more fluid-flow restrictions the pressure applied to said condition-controlling means, a manually operable pressure-controlling valve, and transfer means for connecting said condition-controlling means for operation under the control of said manually-operable control valve and for simultaneously completing by-pass connections around said restrictions.

11. In a control instrument, the combination of a fluid-conducting nozzle, a baffle having a flow-obstructing surface operatively associated with the open end of said nozzle for controlling fluid pressure within said nozzle, a pair of opposed bellows in operative relation with said baffle, one acting upon it in one direction and the other acting upon it in the opposite direction, fluid-flow connections to each bellows, each connection including a flow restriction, condition-controlling means operable by fluid pressure, means for applying to said condition-controlling means a pressure of magnitude determined by the magnitude of the pressure within said nozzle for automatically positioning said condition-controlling means, a manually-operable valve for connection to a source of pressure, and transfer means operative in one position for connecting said manually-operable valve to said condition-controlling means for manual control of the position thereof and for concurrently completing by-pass connections around said restrictions, and operable in a second position for re-establishing fluid-flow connections to said bellows through said restrictions and to disconnect said condition-controlling means from said manually-operable valve and to connect it to a pressure determined by that developed within said nozzle.

12. In a control instrument, the combination of a control lever, means including a thin flat spring rigidly held at one end and at its opposite end connected to said lever forming a pivotal support therefor, bellows disposed respectively on opposite sides of said lever for rotating it in one direction or the other around said pivotal support, a second thin flat spring at one end secured to said lever adjacent the end remote from said first-named pivotal support, a baffle secured to the opposite end of said second spring which forms a pivotal support for said baffle, means including a controlling member engaging said baffle for rotating it in one direction or the other, a fluid-conducting nozzle having its open end in flow-obstructing relation with said baffle, and structure including adjustable means for holding said nozzle in a predetermined position between the ends of said baffle.

13. In a control instrument, the combination of a fluid-conducting nozzle, a flow-obstructing baffle associated with said nozzle, means for adjusting the position of said baffle relative to said nozzle comprising a stationary member, an internally threaded hub rotatably carried by said stationary member, a member threadedly extending through said hub and into engagement with said baffle, rotatable driving means and a support slidably carrying said driving means for movement thereof into selective driving engagement with either said hub or said threaded member for selection of the direction of movement of said baffle with respect to said nozzle upon rotation of said driving means in a given direction.

14. In a control instrument, the combination of a fluid-conducting nozzle, a flow-obstructing baffle associated with said nozzle, means for adjusting the position of said baffle relative to said nozzle comprising a stationary member, an internally threaded hub, means including said stationary member for rotatably supporting said hub in fixed relation therewith, a threaded member threadedly extending through said hub and into engagement with said baffle, driven gears forming driving connections with said hub and said threaded member, driving gears respectively disposed in meshing relation with said driven gears, supporting shafts for said driving gears having lengths such that each driving gear may be slid along the length of its supporting shaft into meshing relation with either the driven gear of said hub or the driven gear of said threaded member for producing either clockwise or counter-clockwise rotation of said threaded member for a given rotation of a driving gear.

JOHN H. McLEOD, Jr.

REFERENCES CITED

The following references are of record in the file of this patent:

UNITED STATES PATENTS

| Number | Name | Date |
| --- | --- | --- |
| 1,837,397 | Bast | Dec. 22, 1931 |
| 1,966,209 | Miller | July 10, 1934 |
| 1,988,348 | Annin | Jan. 15, 1935 |
| 2,072,921 | Mallory | Mar. 9, 1937 |
| 2,285,540 | Stein et al. | June 9, 1942 |
| 2,298,112 | Edwards | Oct. 6, 1942 |
| 2,299,884 | Edwards | Oct. 27, 1942 |
| 2,434,052 | Raney | Jan. 6, 1948 |